(12) United States Patent
Gustafsson (10) Patent No.: US 7,089,429 B2
(45) Date of Patent: Aug. 8, 2006

(54) CREATION OF LOCAL USAGE RIGHTS VOUCHER

(75) Inventor: Patrik Gustafsson, Foster City, CA (US)

(73) Assignee: Nokia Corporation, Espoo (FI)

( * ) Notice: Subject to any disclaimer, the term of this patent is extended or adjusted under 35 U.S.C. 154(b) by 391 days.

(21) Appl. No.: 10/302,915

(22) Filed: Nov. 25, 2002

(65) Prior Publication Data

US 2004/0103295 A1 May 27, 2004

(51) Int. Cl.
*H04L 9/00* (2006.01)
*G09G 5/00* (2006.01)

(52) U.S. Cl. ............... 713/200; 713/156; 713/189; 380/270; 705/59; 455/558; 725/25; 709/230; 709/231

(58) Field of Classification Search ............... 713/156, 713/189, 200; 380/270; 705/59; 455/558; 725/25; 709/230–231
See application file for complete search history.

(56) References Cited

U.S. PATENT DOCUMENTS

| | | | |
|---|---|---|---|
| 5,892,900 A | 4/1999 | Ginter et al. | |
| 5,915,019 A | 6/1999 | Ginter et al. | |
| 5,991,876 A | 11/1999 | Johnson et al. | |
| 6,041,411 A | 3/2000 | Wyatt | |
| 6,075,458 A | 6/2000 | Ladner et al. | |
| 6,279,111 B1 | 8/2001 | Jensenworth et al. | |
| 6,314,409 B1 | 11/2001 | Schneck et al. | |
| 2003/0065802 A1 * | 4/2003 | Vitikainen et al. | 709/231 |
| 2003/0076957 A1 * | 4/2003 | Asokan et al. | 380/270 |
| 2003/0130953 A1 * | 7/2003 | Narasimhan et al. | 705/59 |
| 2003/0131353 A1 * | 7/2003 | Blom et al. | 725/25 |
| 2003/0224823 A1 * | 12/2003 | Hurst et al. | 455/558 |
| 2003/0226012 A1 * | 12/2003 | Asokan et al. | 713/156 |

OTHER PUBLICATIONS

Digital Rights management for Content distribution, Proceedings of the Australasian information security workshop conference on ACSW frontiers 2003—vol. 21 Adelaide, Australia , pp.: 49–58 , Year of Publication: 2003 , ISBN—ISSN:1445–1336.*

Mobile Digital Rights management, Zheng Yan, Nokia Research Center, Publications in Telecommunications Software and Multimedia TML–C7 ISSN 1455–9749, 2001, downloaded from the Internet Sep. 2004.*

Analysis of E–book Security, Guoyou He, Publications in Telecommunications Software and Multimedia TML–C7 ISSN 1455–9749, 2001, downloaded from the Internet Sep. 2004.*

Digital Rights Management Overview, Austin Russ, Security Essentials V1.2e,SANS □□Institute, Jul. 2001, downloaded from the Internet , Sep. 2, 2004. □□.*

* cited by examiner

*Primary Examiner*—Ayaz Sheikh
*Assistant Examiner*—Taghi T. Arani
(74) *Attorney, Agent, or Firm*—Morgan & Finnegan, L.L.P.

(57) ABSTRACT

A method, computer system, and computer program product for restricting access to digital content data. The disclosed invention stores the digital content data on a user device, and classifies the digital content data as either controlled data or non-controlled data. If the digital content data is controlled data, the disclosed invention stores a trusted voucher on the user device, the trusted voucher being associated with the controlled data and comprising at least one permitted function, and restricts access to the controlled data by the user device to said at least one permitted function. If the digital content data is non-controlled data, the disclosed invention associates a local voucher stored on the user device with the non-controlled data, the local voucher comprising at least one intended function, and restricts access to the non-controlled data by the user device to said at least one intended function.

9 Claims, 5 Drawing Sheets

CREATION OF LOCAL USAGE RIGHTS VOUCHER

FIELD OF THE INVENTION

The disclosed invention relates generally to computing systems and data processing. In particular, the disclosed invention is a system, method, and computer program product for restricting access to digital content data based on a classification of the digital content data.

BACKGROUND OF THE INVENTION

Digital technology dramatically impacts the creation, distribution, sale, marketing, and consumption of copyrighted digital content. Due to the popularity of the Internet and mobile devices, producers of digital content are under pressure and have a desire to profit from these new developments and reduce their vulnerability to the risk. The risks are more obvious to producers of digital content than the potential benefits of the new technologies.

In the pre-digital age, copyright protection systems consisted of legal mechanisms to prosecute individuals and groups that ran large-scale illegal reproduction facilities for profit. Intellectual property pirates in the pre-digital age were subject to traditional law enforcement techniques because they required physical assets to reproduce the physical media of the books, music, or video. In addition, the complications imposed by distribution of the reproduced copies made the intellectual property pirates even more vulnerable to detection. From the consumer's perspective, an illegal copy was not as attractive as a legal copy because the illegal copy was typically lower quality and not promptly available.

The digital age provide the intellectual property pirates with the ability to make flawless copies that are infinitely reproducible and may be transmitted instantly anywhere in the world. This marked a shift from a paradigm where a large number of individuals made a few copies to one where relatively few individuals can make many copies. The introduction of cassette tapes in the early 1980s was the first notable example of pirating in the digital age. The record companies combated the piracy by printing on the record jackets the slogan "Home Taping Is Killing Music". Eventually this lead to cassette tape manufacturers paying mandatory licensing fees to the holder of the intellectual property rights to the work.

Producers of digital content are rightfully concerned with this new capacity to cheat them of a fair return on their intellectual property and have been reluctant to take advantage of digital commerce opportunities. Yet digital commerce offers the potential to increase earnings while cutting the high overhead costs of production, distribution, warehousing their goods while presenting new business opportunities. It is believed that if producers of digital content were sufficiently confident in their ability to protect their assets in digital form, they would gladly take part in such a system.

Legal and regulatory means exist to protect digital content however, a deterrent is necessary to make the illegal copying and distribution of copyrighted digital content difficult and traceable. For this reason, the deployment of a solution for the management of digital rights is a necessary precursor to digital production, dissemination and consumption of copyrighted digital content. The solution does not have to be technically unbreakable, but merely leverage the laziness of a typical user by making it hard for the typical user to bypass restrictions or rules.

Digital Rights Management (DRM) involves the description, layering, analysis, valuation, trading, and monitoring of an owner's property rights to an asset. DRM covers the management of the digital rights to the physical manifestation of a work (e.g., a textbook) or the digital manifestation of a work (e.g., a Web page). DRM also covers the management of an asset whether the asset has a tangible or an intangible value. Current DRM technologies include languages that describe the terms and conditions required by an owner when a buyer purchases an asset, systems that track asset usage by enforcing controlled environments or encoded asset manifestations, and closed architectures for the overall management of the intellectual property rights held by the owner.

The Open Digital Rights Language (ODRL) is a DRM architecture standard for protecting digital content in an open or trusted computing environment. ODRL defines a standard vocabulary for expressing the terms and conditions over an asset. ODRL covers a core set of semantics for these purposes including the identification of the property rights to the work and the expression of permissible uses for manifestations of a protected asset. Rights can be specified for a specific asset manifestation or format or could be applied to a range of manifestations of the asset. ODRL does not enforce or mandate any policy for DRM, but provides the mechanisms to express such a policy. ODRL does not presume that mechanisms exist to achieve a secure architecture, but complements existing rights management standards by providing digital equivalents and supports an expandable range of new services that can be afforded by the digital nature of the assets in the Web environment. In the physical environment, ODRL can enable machine-based processing for DRM. The web site "http://odrl.net" includes more information about ODRL, as well as, ODRL electronic resources such as the ODRL Specification (version 1.1), the ODRL Data Dictionary (version 1.1), and the ODRL Expression Language (version 1.1).

The eXtensible Markup Language (XML) is a standard for exchanging data and metadata electronically. Metadata is data that describes data. For example, the term "author" is metadata that describes the data "William Shakespeare". XML is an outgrowth of the Standard Generalized Markup Language (SGML) that allows the author of an XML document to separate the logical content of the document from the presentation of the content. An author of an XML document adds metadata to a document as hypertext transfer protocol (HTTP) tags in the document. A document type definitions (DTD) file is the mechanism that adds shared content to the XML document. The web site "http://www.w3.org/" includes more information about XML.

The eXtensible rights Markup Language (XrML) is an XML conforming language definition that specifies rights, fees, and conditions for using digital content. XrML also describes message integrity and entity authentication rules. XrML supports commerce in digital content such as publishing and selling electronic books, digital movies, digital music, interactive games, and computer software. In addition, XrML supports the specification of access and use controls for secure digital documents in cases where financial exchange is not part of the terms of use. The web site "http://www.xrml.org/" includes more information about XrML.

Superdistribution involves transmitting, or communicating in some manner, digital content from one user device to another user device. Superdistribution of digital content is problematic because it is an efficient means for distributing the digital content, but management of the digital rights associated with the digital content is difficult. The Napster web site allows authenticated users to freely distribute MP3 audio files and is an excellent example of the benefit and the bane of superdistribution. When an authenticated user accesses the Napster web site, Napster adds the address of the authenticated user's local computer to a list of every authenticated user. Any authenticated user can access any other authenticated user's local computer to retrieve stored MP3 audio files. The commercial digital content providers who produce the songs that comprise an album were not pleased with Napster because they were not able to recoup payment for each transfer of their songs. Thus, Napster's efficient superdistribution scheme usurped the digital rights owned by the commercial digital content providers.

The Bluetooth specification describes the operation of a Bluetooth device and short-range radio network communication protocols necessary to create an ad hoc network of up to eight devices operating together. Each Bluetooth device operates in the 2.4 GHz radio band reserved for general use by Industrial, Scientific, and Medical (ISM) applications. Each Bluetooth device periodically attempts to find any other Bluetooth device within their ten-meter radio communications range. When two Bluetooth devices are in the ten-meter range, each device determines the services offered by the other device using a service discovery protocol (SDP). The SDP searching function relies on links being established between the requesting Bluetooth device in a client role and the responding Bluetooth device in a server role to find out about services in the responding Bluetooth device and how to connect to them. The web site "http://www.bluetooth.com/" includes more information about Bluetooth, as well as, Bluetooth electronic resources such as the Bluetooth Specification (version 1.1) and the Bluetooth Profiles (version 1.1).

An inquiring Bluetooth device initiates a connection with another Bluetooth device by sending an inquiry message to every other Bluetooth device in the vicinity of the inquiring Bluetooth device. When another Bluetooth device in the vicinity performs an inquiry scan, the other Bluetooth device recognizes the inquiry message and responds appropriately. The inquiry response is a message packet containing the Bluetooth Device Address (BD_ADDR) for the responding device. The Bluetooth Device Address is a unique, 48-bit IEEE address that is unique for each Bluetooth device.

The inquiring device uses the information provided in the inquiry response packet, to prepare and send a paging message to the responding device. The inquiring device enters a page state to establish a connection and transmits initial paging messages to the responding device using the access code and timing information acquired from the inquiry response packet. The responding device must be in a page-scan state to allow a connection to the inquiring device. Once in the page-scan state, the responding device acknowledges the initial paging messages and the inquiring device sends a paging packet that provides the clock timing and access code of the inquiring device to the responding device. The responding device responds with a page-acknowledgment packet. This enables the two devices to form a connection and both devices transition into a connection state. The inquiring device that has initiated the connection assumes the role of a master device and the responding device assumes the role of a slave device in a new ad hoc network piconet.

Each piconet includes one master device and up to seven slave devices. All communication is directed between the master device and each respective slave device. The master initiates an exchange of data and the slave responds to the master. When two slave devices communicate with each other, they must do so through the master device. The master device maintains the network clock for the piconet and controls when each slave device can communicate with the master device. Members of the ad hoc network piconet join and leave as they move into and out of the range of the master device. A piconet can support distributed activities, such as collaborative work projects, collaborative games, multi-user gateways to the Internet, and the like. A user's device that joins a particular piconet does so to enable its user to participate in the currently running collaborative activity.

A Bluetooth enabled laptop computer can send information to a Bluetooth enabled printer in the next room. A Bluetooth enabled microwave oven can send a message to a Bluetooth enabled mobile phone announcing that the meal is ready. Bluetooth will become the standard in mobile phones, PCs, laptops and other electronic devices, enabling users to share information, synchronize data, access the Internet, integrate with LANs or actuate electromechanical devices, such as unlocking a car. A passenger can use a laptop or handheld computer to compose an electronic mail message while flying in an airplane and, after landing, Bluetooth devices that are ubiquitously located around the airport terminal can automatically forward the messages to the Internet. In another example, while waiting in an airport lounge, the passenger can receive interesting duty-free offers directly on the laptop or handheld computer or play multi-player games with friends.

There is a need to protect the property rights of commercial providers of controlled digital content. For the commercial providers to generate revenue from the controlled digital content that they own it must be sufficiently difficult to use the controlled digital content outside of their control. There is also a need to allow non-controlled digital content to become a mass-market phenomenon and evolve as a grass-roots movement without any control by the providers of controlled digital content. Thus, there is a need for a digital rights management system, method, and computer program product for restricting access to digital content data based on a classification of the digital content data as either controlled digital content or non-controlled digital content.

SUMMARY OF THE INVENTION

A method, computer system, and computer program product for restricting access to digital content data. The disclosed invention stores the digital content data on a user device, and classifies the digital content data to determine whether the digital content data is controlled digital content data or non-controlled digital content data.

If the digital content data is controlled digital content data, the disclosed invention also stores a trusted voucher on the user device, the trusted voucher being associated with the controlled digital content data and comprising at least one permitted function, and restricts access to the controlled digital content data by the user device to said at least one permitted function. To restrict access to the controlled digital content data, the disclosed invention allows the user device to perform said at least one permitted function upon the digital content data. In one embodiment, said at least one permitted function includes printing, copying, forwarding, rendering, or displaying the controlled digital content data with a helper application including one or more of a video player, an audio player, or a viewer. In another embodiment, the disclosed invention also sends the controlled digital content data and the trusted voucher associated with the controlled digital content to another user device.

If the digital content data is non-controlled digital content data, the disclosed invention also associates a local voucher stored on the user device with the non-controlled digital content data, the local voucher comprising at least one intended function, and restricts access to the non-controlled digital content data by the user device to said at least one intended function. In one embodiment, the local voucher associated with the non-controlled digital content data is a forwarded local voucher. In another embodiment, the disclosed invention restricts access to the non-controlled digital content data based on a physical characteristic of the user device. The physical characteristic include one or more of a maximum number of non-controlled digital content data stored on the user device, and a duration of time since the storing of the digital content data on the user device. If an installed number of non-controlled digital content data stored on the user device equals the maximum number of non-controlled digital content data stored on the user device, before the storing of the digital content data, another embodiment selects an installed non-controlled digital content data from the installed number of non-controlled digital content data stored on the user device, and deletes the installed non-controlled digital content data. In another embodiment, the disclosed invention deletes the local voucher associated with the installed non-controlled digital content data.

To associate the local voucher, the disclosed invention creates the local voucher, stores the local voucher, selects an intended function from said at least one intended function, and stores the intended function in the local voucher. To select the intended function, the disclosed invention selects at least one secondary function, and stores said at least one secondary function in the local voucher. This allows the disclosed invention to restrict access to the non-controlled digital content data by the user to said at least one secondary function. In one embodiment, the disclosed invention stores the digital content data before selecting the intended function. In another embodiment, the intended function and said at least one secondary function include printing, copying, forwarding, rendering, or displaying the non-controlled digital content data with a helper application including one or more of a video player, an audio player, or a viewer.

In another embodiment, the disclosed invention also installs the digital content data on the user device. In this embodiment, the disclosed invention may install the digital content data before associating the local voucher with the non-controlled digital content data. In another embodiment, the user device is a mobile device such as a Bluetooth device. In another embodiment, the local voucher complies with a digital rights management method including methods expressed with the Open Digital Rights Language, the eXtensible rights Markup Language, or other digital rights management methods expressed with the extensible Markup Language or a markup language based thereon. In another embodiment, the disclosed invention also sends the non-controlled digital content data to another user device. In this embodiment, the disclosed invention may also sending the local voucher associated with the non-controlled digital content data to the other user device.

BRIEF DESCRIPTION OF THE DRAWINGS

The accompanying figures best illustrate the details of the method, system, and apparatus for restricting access to digital content in a mobile communication environment, both as to its structure and operation. Like reference numbers and designations in these figures refer to like elements.

DETAILED DESCRIPTION OF THE INVENTION

Figure 1:
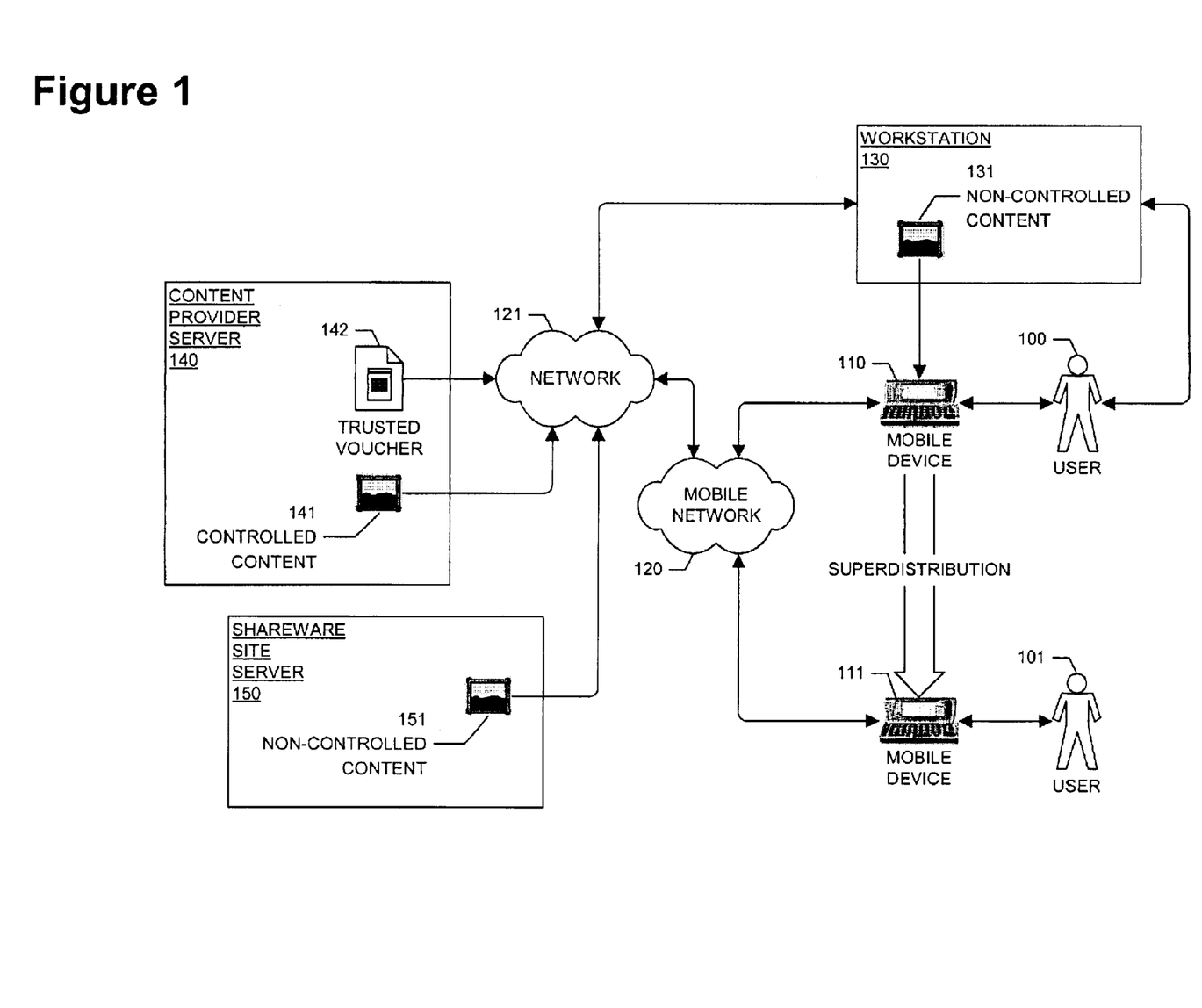
FIG. 1 is a network diagram that illustrates a system, method, and computer program product for restricting access to digital content in a mobile environment.

FIG. 1 is a network diagram that illustrates a system, method, and computer program product for restricting access to digital content in a mobile environment. Mobile device 110 and mobile device 111 are general-purpose wireless devices operated, respectively, by user 100 and user 101 to communicate with mobile network 120. Mobile network 120 connects via a network bridge with network 121 to communicate with workstation 130, content provider server 140, and shareware site server 150. One skilled in the art will realize that workstation 130, content provider server 140, and shareware site server 150 are exemplary devices connected to network 121 and are not intended to limit the system, method, and computer program product for restricting access to digital content in a mobile environment.

Mobile network 120 is a wireless communication network. The system, method, and computer program product for restricting access to digital content in a mobile environment shown in FIG. 1 also contemplates the use of comparable network architectures. Comparable network architectures include a cellular network, a digital communication network such as Global System for Mobile communications or Code-Division Multiple Access, a satellite network, and a Bluetooth network.

Network 121 is a public communication network. The system, method, and computer program product for restricting access to digital content in a mobile environment shown in FIG. 1 also contemplates the use of comparable network architectures. Comparable network architectures include a public switched telephone network, a wireless network, and a private network. A wireless network includes a cellular network, a digital communication network such as Global System for Mobile communications or Code-Division Multiple Access, and a satellite network. A private network includes a local area network, a personal area network such as a Bluetooth network, an intranet, and an extranet. An intranet is a private communication network that provides an organization, such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The disclosed invention also contemplates network protocols such as Ethernet, Token Ring, Systems Network Architecture protocols, Transmission Control Protocol, and proprietary network protocols comparable to the Internet protocol.

Workstation 130 is a general-purpose personal computer or workstation configured to connect to network 121 and mobile device 110. In one embodiment of the disclosed invention, user 100 operates workstation 130 to create and edit non-controlled content 131. Non-controlled content 131 includes, but is not limited to, a cellular telephone ring tone, screen saver, wallpaper, call-group indicator, alert indicator, or digital image. Once the creation and editing is complete, user 100 transfers non-controlled content 131 to mobile device 110 via a connection such as a universal serial bus (USB) connection, infrared (IR) port, or analog modem. In another embodiment of the disclosed invention, workstation 130 is a digital camera, digital video recorder, or another mobile device. In yet another embodiment of the disclosed invention, another user (e.g., user 101) may create and transfer non-controlled content 131 to mobile device 110.

Content provider server 140 is a general-purpose network computer configured to connect to network 121 and service web server requests from network users. In one embodiment of the disclosed invention, content provider server 140 stores controlled content 141 and trusted voucher 142. In another embodiment of the disclosed invention, trusted voucher 142 may be stored in a voucher server that is separate from, but preferably linked to content provider server 140. Trusted voucher 142 is a digital rights management object such as an extensible Markup Language (XML) Voucher (see "XML Voucher: Generic Voucher Language", IETF Trade Working Group, June 2002, http://www2.ieft.org/internet-drafts/draft-ietf-trade-voucher-lang-03.txt) that controls access to controlled content 141. A method such as digital encryption obscures access to controlled content 141. Trusted voucher 142 is the key that unlocks the digital encryption.

Shareware site server 150 is a general-purpose network computer configured to connect to network 121 and respond to web server requests for data from network users. Shareware site server 150 stores non-controlled content 151. Any user of network 121 can access non-controlled content 151 because nothing obscures access to non-controlled content 151.

In another embodiment of the disclosed invention, user 100 operates workstation 130 to download controlled and non-controlled digital content via network 121 from content provider server 140 or shareware site server 150. If a digital rights management object, such as trusted voucher 142, protects the commercial digital content, workstation 130 will also download the digital rights management object.

Mobile device 110 and mobile device 111 are general-purpose wireless devices configured to connect to mobile network 120. Mobile device 110 and mobile device 111 include, but are not limited to devices such as a cellular telephone, a personal digital assistant (PDA), or a pager. Mobile device 110 and mobile device 111 include a memory device that stores the programmed instructions that perform the steps of the method for restricting access to digital content in a mobile environment.

FIG. 1 also illustrates superdistribution of controlled and non-controlled digital content from a distributing mobile device to a receiving mobile device. Mobile device 110 is the distributing mobile device. Mobile device 111 is the receiving mobile device. User 100 operates mobile device 110 to distribute stored digital content to mobile device 111 operated by user 101. The communications means for transferring the digital content includes a universal serial bus (USB) connection, an infrared (IR) port, or wireless communication via mobile network 120.

Figure 2:
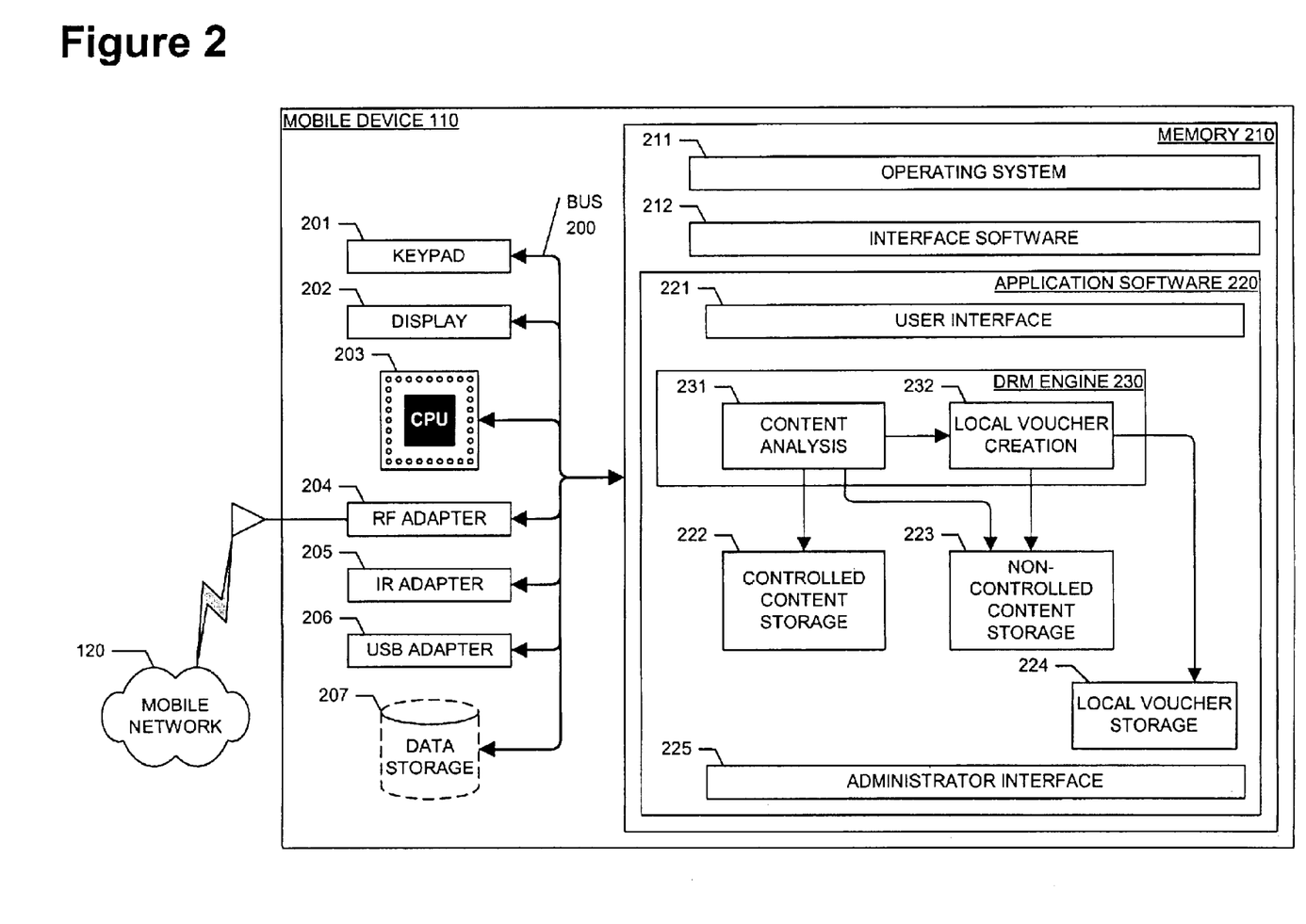
FIG. 2 is a block diagram that illustrates the hardware and software components comprising mobile device 110 shown in FIG. 1.

FIG. 2 is a block diagram that illustrates the hardware and software components comprising mobile device 110 shown in FIG. 1. Mobile device 110 is a general-purpose wireless device. Bus 200 is a communication medium that connects keypad 201, display 202, central processing unit (CPU) 203, radio-frequency (RF) adapter 204, infrared (IR) adapter 205, universal serial bus (USB) adapter 206, and data storage 207 to memory 210. RF adapter 204 connects via a wireless link to mobile network 120 and is the mechanism that facilitates network traffic between mobile device 110 and mobile network 120. IR adapter 205 and USB adapter 206 connect mobile device 110 to other devices such as mobile device 111 and workstation 130. Data storage 207 is an optional component to mobile device 110. If present, data storage 207 includes devices such as fixed disk hard drives, flash memory cards, and single in-line memory module. CPU 203 performs the methods of the disclosed invention by executing the sequences of operational instructions that comprise each computer program resident in, or operative on, memory 210.

In one embodiment of the disclosed invention, the configuration of memory 210 includes operating system 211, interface software 212, and application software 220. Application software 220 further includes user interface 221, controlled content storage 222, non-controlled content storage 223, local voucher storage 224, administrator interface 225, and digital rights management (DRM) engine 230. DRM engine 230 further includes content analysis 231 and local voucher creation 232. Each computer program resident in memory 210 stores intermediate results in memory 210 and transmits final results via bus 200 for storage in data storage 207 or transmission to mobile network 120. One skilled in the art will realize that the configuration of memory 210 may not include the programs listed above simultaneously. CPU 203 coordinates loading a program when it is needed, storing intermediate results, transferring data from one program to another, and unloading the program when it is no longer needed.

Operating system 211 includes embedded software and low-level system software that controls mobile device 110 and the communication with components such as keypad 201 and display 202. Interface software 212 includes the software that interfaces with RF adapter 204, IR adapter 205, and USB adapter 206.

User interface 221 and administration interface 225 control the interaction between user 100 and application software 220. Content analysis 231 receives the digital content, determines the classification of the content, and either stores the digital content in controlled content storage 222 or non-controlled content storage 223. In one embodiment of the disclosed invention, if the digital content is non-controlled digital content, DRM engine 230 creates a local voucher 232 and stores the associated local voucher in local voucher storage 224. In another embodiment of the disclosed invention, when a local voucher is forwarded with the non-controlled digital content, the forwarded local voucher may be stored in local voucher storage 224.

Figure 3A:
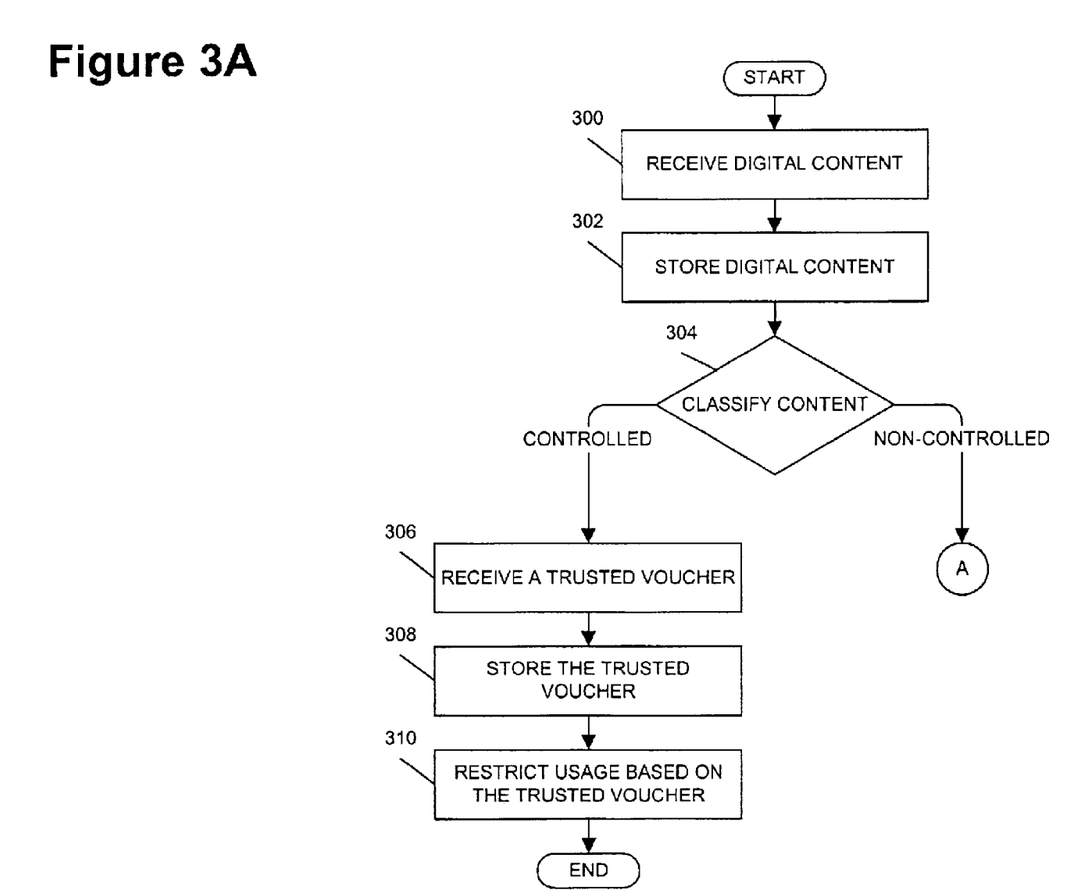
FIGS. 3A and 3B are flow diagrams that illustrate receiving digital content and controlling access to the digital content with a digital rights management structure.
Figure 3B:
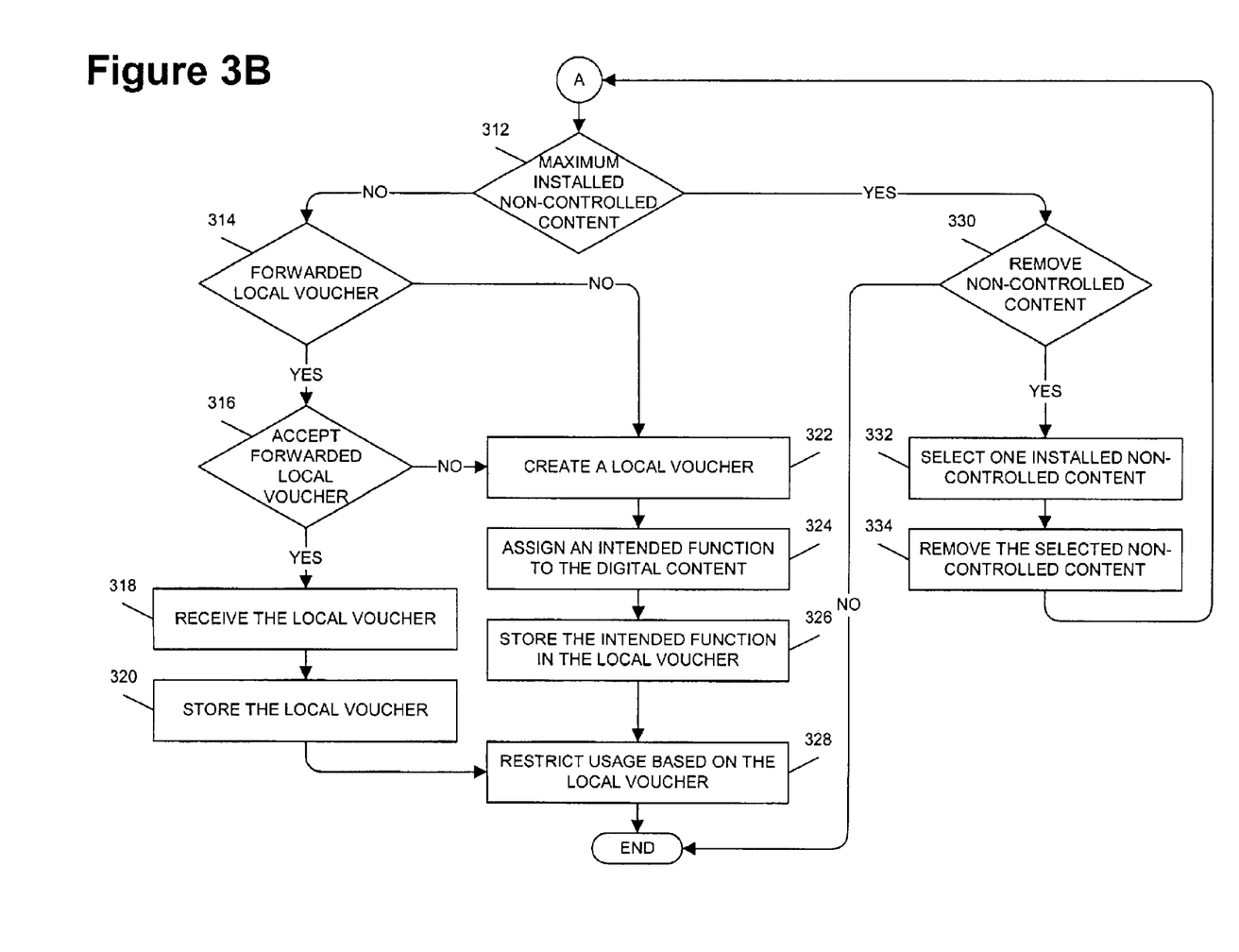

The process illustrated in FIGS. 3A and 3B depict a device such as mobile device 110 receiving digital content and controlling access to the digital content with a digital rights management object. The process begins at step 300. Mobile device 110 receives digital content via a connection such as network 121, universal serial bus (USB) connection, infrared (IR) port, or analog modem. Mobile device 110 stores the digital content (step 302) in memory 210 or data storage 207. The process begins by determining whether the digital content is controlled or non-controlled (step 304).

In one embodiment of the disclosed invention, if the process determines (step 304) that the digital content is controlled, mobile device 110 receives a trusted voucher (step 306) from the same source that sent the controlled digital content. Mobile device 110 stores the trusted voucher (step 308) in memory 210 or data storage 207. Mobile device 110 begins to restrict usage of (i.e., access to) the digital content (step 310) based on the limitation imposed by the trusted voucher. In another embodiment of the disclosed invention, mobile device 110 may receive the trusted voucher from a source other than the source that sent the controlled digital content. This embodiment would link the source for the controlled digital content and the source for the trusted voucher to each other.

If the process determines (step 304) that the digital content is non-controlled, mobile device 110 first determines whether mobile device 110 currently stores the maximum number of non-controlled digital content items (step 312). For example, if mobile device 110 can only store three non-controlled digital content items, the process rejects installing a fourth non-controlled digital content item (step 312) and determines whether user 100 wishes to remove or delete one of the installed non-controlled digital content items (step 330). If user 100 does not wish to remove or delete one of the installed non-controlled digital content items, the process ends. If user 100 wishes to remove or delete one of the installed non-controlled digital content items, user 100 selects which item to remove or delete (step 332). After mobile device 110 removes the selected item (step 334), the process rechecks whether mobile device 110 currently stores the maximum number of non-controlled digital content items (step 312) and continues processing. In one embodiment of the disclosed invention, mobile device 110 may remove or delete the local voucher associated with the non-controlled digital content item from local voucher storage 224.

The process determines whether the transmission of the installed non-controlled digital content item includes a local voucher (step 314) or is associated with a local voucher. If the transmission includes a local voucher, the process then determines whether user 100 wishes to accept the forwarded local voucher (step 316). If user 100 accepts the forwarded local voucher, mobile device 110 receives the local voucher (step 318), stores the local voucher (step 320), and restricts usage of (i.e., access to) the non-controlled digital content based on the limitations imposed by the local voucher (step 328). If the transmission does not include a local voucher or if user 100 does not accept a local voucher forwarded with the non-controlled digital content, the process creates a local voucher (step 322). User 100 assigns at least one intended function to the non-controlled digital content (step 324) and requests to store the intended function in the local voucher (step 326) and store the local voucher in memory 210 or data storage 207 of mobile device 110. Similar to the case of accepting a forwarded local voucher, mobile device 110 restricts usage of the non-controlled digital content based on the limitations imposed by the local voucher (step 328). The intended function includes, but is not limited to, printing, copying, forwarding, rendering (e.g., storing data in video memory that a CPU accesses and displays on a cathode ray tube monitor), or displaying digital content data with a helper application such as a video player, audio player, or viewer. In another embodiment, the process may also store a secondary function.

Figure 4:
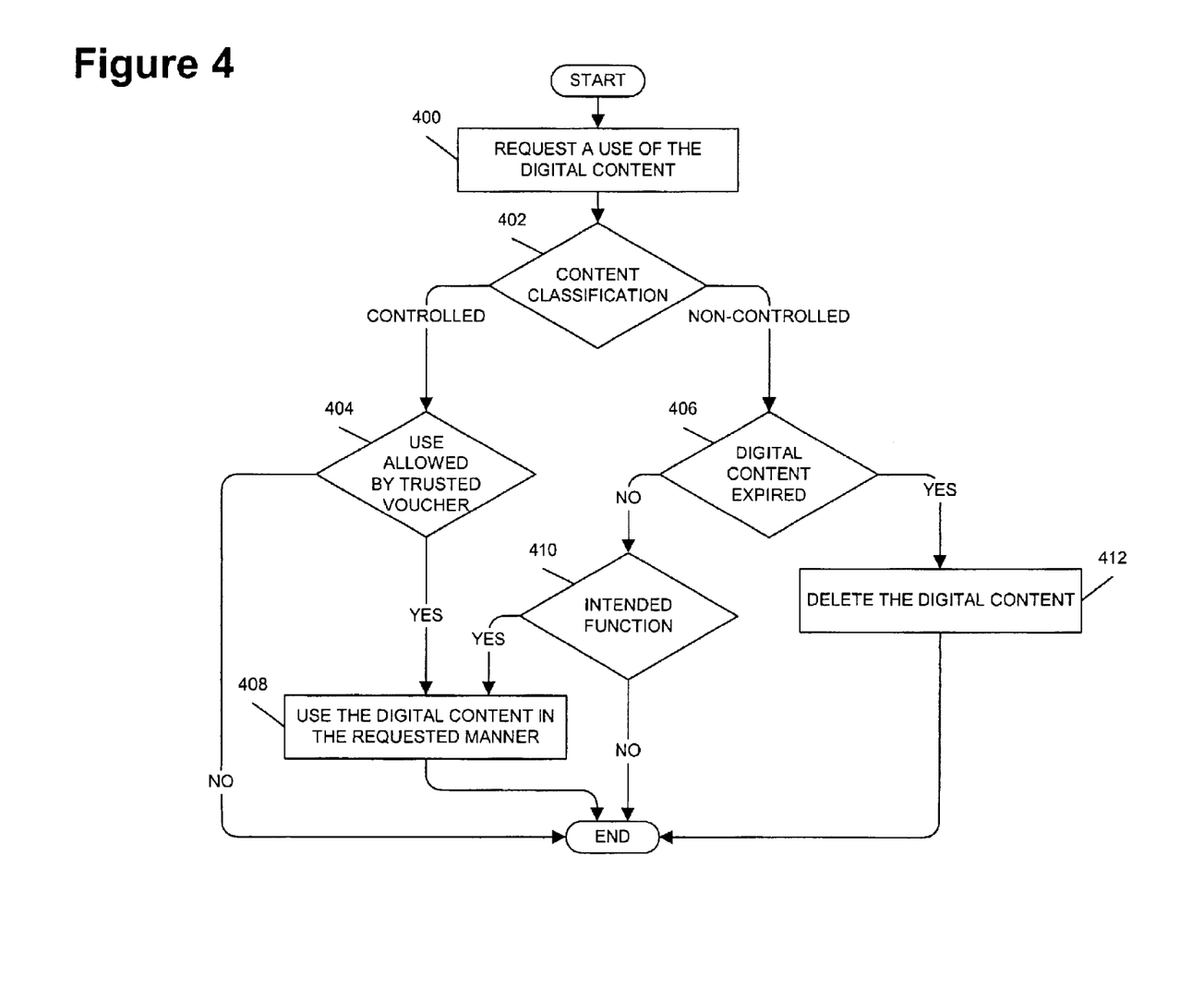
FIG. 4 is a flow diagram that illustrates accessing digital content protected by the digital rights management structure.

The process illustrated in FIG. 4 depicts a device such as mobile device 110 using digital content protected by a digital rights management object. The process begins at step 400. User 100 makes a request for mobile device 110 to use a digital content item in a particular manner. The process begins by determining whether the digital content is controlled or non-controlled (step 402). If the digital content is controlled, the process determines whether the trusted voucher allows user 100 to use the controlled digital content in the requested manner. If the trusted voucher allows the requested use, the process directs mobile device 110 to perform the requested use (step 408). If the trusted voucher does not allow the requested use, the process terminates. If the digital content is non-controlled, the process determines whether the controlled digital content has exceeded its lifetime (step 406). If the lifetime of the non-controlled digital content expired, the process automatically deletes the non-controlled digital content (step 412) and terminates. In one embodiment of the disclosed invention, the process also removes or deletes the associated local voucher. If the lifetime of the non-controlled digital content is eternal or has not expired, the process determines whether the intended function assigned to the local voucher allows user 100 to use the non-controlled digital content in the requested manner (step 410). If the requested use agrees with the intended use, the process directs mobile device 110 to perform the requested use (step 408).

Although the embodiments of the disclosed invention describe a fully functioning system, method, and computer program product that restricts usage of digital content in a mobile environment, the reader should understand that other equivalent embodiments exist. Since numerous modifications and variations will occur to those who review this disclosure, the system, method, and computer program product that restricts usage of digital content in a mobile environment is not limited to the exact construction and operation as illustrated and disclosed. Accordingly, this disclosure intends all suitable modifications and equivalents to fall within the scope of the claims.

I claim:

1. A method of restricting access to digital content data, comprising:

storing the digital content data on a user device;

classifying the digital content data to determine whether the digital content data is controlled digital content data or non-controlled digital content data;

if the digital content data is controlled digital content data:
storing a trusted voucher on the user device, the trusted voucher being associated with the controlled digital content data and comprising at least one permitted function; and
restricting access to the controlled digital content data by the user device to said at least one permitted function; and if the digital content data is non-controlled digital content data:
associating a local voucher stored on the user device with the non-controlled digital content data, the local voucher comprising at least one intended function;
restricting access to the non-controlled digital content data by the user device to said at least one intended function;
restricting access to the non-controlled digital content data based on a physical characteristic of the user device; and
wherein the physical characteristic includes one or more of a maximum number of non-controlled digital content data stored on the user device, and a duration of time since the storing of the digital content data on the user device.

2. The method of claim 1, wherein if an installed number of non-controlled digital content data stored on the user device equals the maximum number of non-controlled digital content data stored on the user device, before the storing of the digital content data, the method further comprises:

selecting an installed non-controlled digital content data from the installed number of non-controlled digital content data stored on the user device; and deleting the installed non-controlled digital content data.

3. The method of claim 2, further comprising:

deleting the local voucher associated with the installed non-controlled digital content data.

4. A computer system for restricting access to digital content data, comprising:

a memory device; and a processor disposed in communication with the memory device, the processor configured to:

store the digital content data on a user device;

classify the digital content data to determine whether the digital content data is controlled digital content data or non-controlled digital content data;

if the digital content data is controlled digital content data:
store a trusted voucher on the user device, the trusted voucher being associated with the controlled digital content data and comprising at least one permitted function;
restrict access to the controlled digital content data by the user device to said at least one permitted function;

if the digital content data is non-controlled digital content data:
associate a local voucher stored on the user device with the non-controlled digital content data, the local voucher comprising at least one intended function; and
restrict access to the non-controlled digital content data by the user device to said at least one intended function;
restrict access to the non-controlled digital content data based on a physical characteristic of the user device; and
wherein the physical characteristic includes one or more of a maximum number of non-controlled digital content data stored on the user device, and a duration of time since storing the digital content data on the user device.

5. The computer system of claim 4, wherein if an installed number of non-controlled digital content data stored on the user device equals the maximum number of non-controlled digital content data stored on the user device, before storing the digital content data, the processor is further configured to:

select an installed non-controlled digital content data from the installed number of non-controlled digital content data stored on the user device; and delete the installed non-controlled digital content data.

6. The computer system of claim 5, wherein the processor is further configured to:

delete the local voucher associated with the installed non-controlled digital content data.

7. A computer program product for restricting access to digital content data, comprising:

a computer readable medium;

program code in the computer readable medium for storing the digital content data on a user device;

program code in the computer readable medium for classifying the digital content data to determine whether the digital content data is controlled digital content data or non-controlled digital content data;

program code in the computer readable medium for storing a trusted voucher on the user device, the trusted voucher being associated with the controlled digital content data and comprising at least one permitted function;

program code in the computer readable medium for restricting access to the controlled digital content data by the user device to said at least one permitted function;

program code in the computer readable medium for associating a local voucher stored on the user device with the non-controlled digital content data, the local voucher comprising at least one intended function;

program code in the computer readable medium for restricting access to the non-controlled digital content data by the user device to said at least one intended function;

program code in the computer readable medium for restricting access to the non-controlled digital content data based on a physical characteristic of the user device; and wherein the physical characteristic includes one or more of a maximum number of non-controlled digital content data stored in the user device, and a duration of time since the storing of the digital content data on the user device.

8. The computer program product of claim 7, wherein program code in the computer readable medium further comprises:

program code in the computer readable medium for comparing an installed number of non-controlled digital content data stored on the user device to the maximum number of non-controlled digital content data stored on the user device;

program code in the computer readable medium for selecting an installed non-controlled digital content data from the installed number of non-controlled digital content data stored on the user device; and program code in the computer readable medium for deleting the installed non-controlled digital content data.

9. The computer program product of claim 8, further comprising:

program code in the computer readable medium for deleting the local voucher associated with the installed non-controlled digital content data.

* * * * *